Dec. 25, 1945. W. H. GREEN 2,391,697
LIQUID TREATING APPARATUS AND PROCESS
Filed May 26, 1943 2 Sheets-Sheet 1
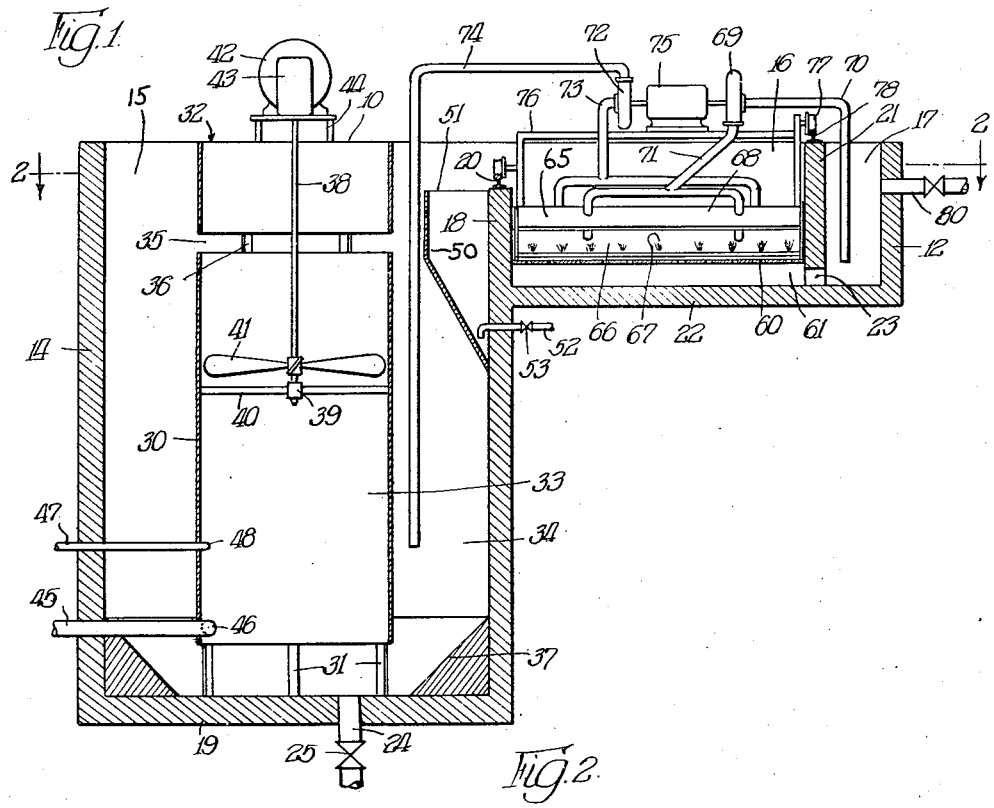
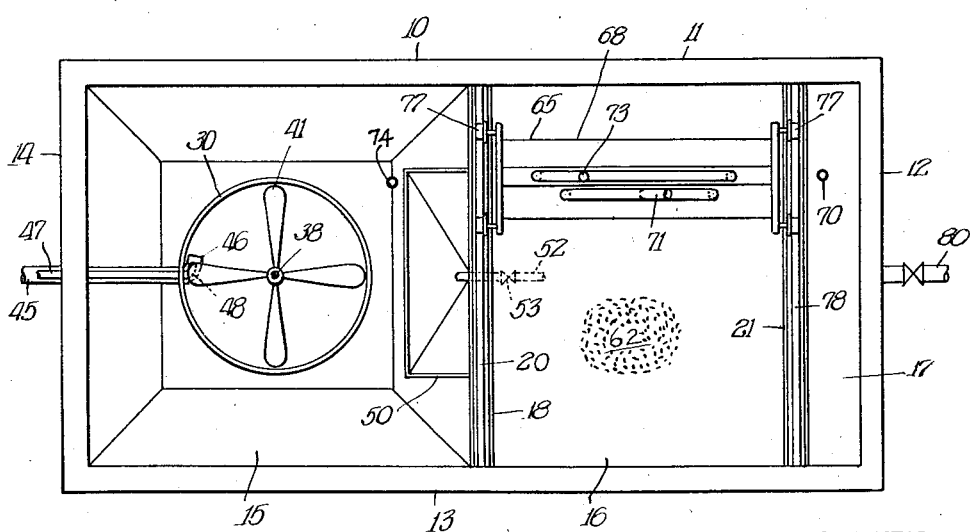
INVENTOR.
Walter H. Green,
BY

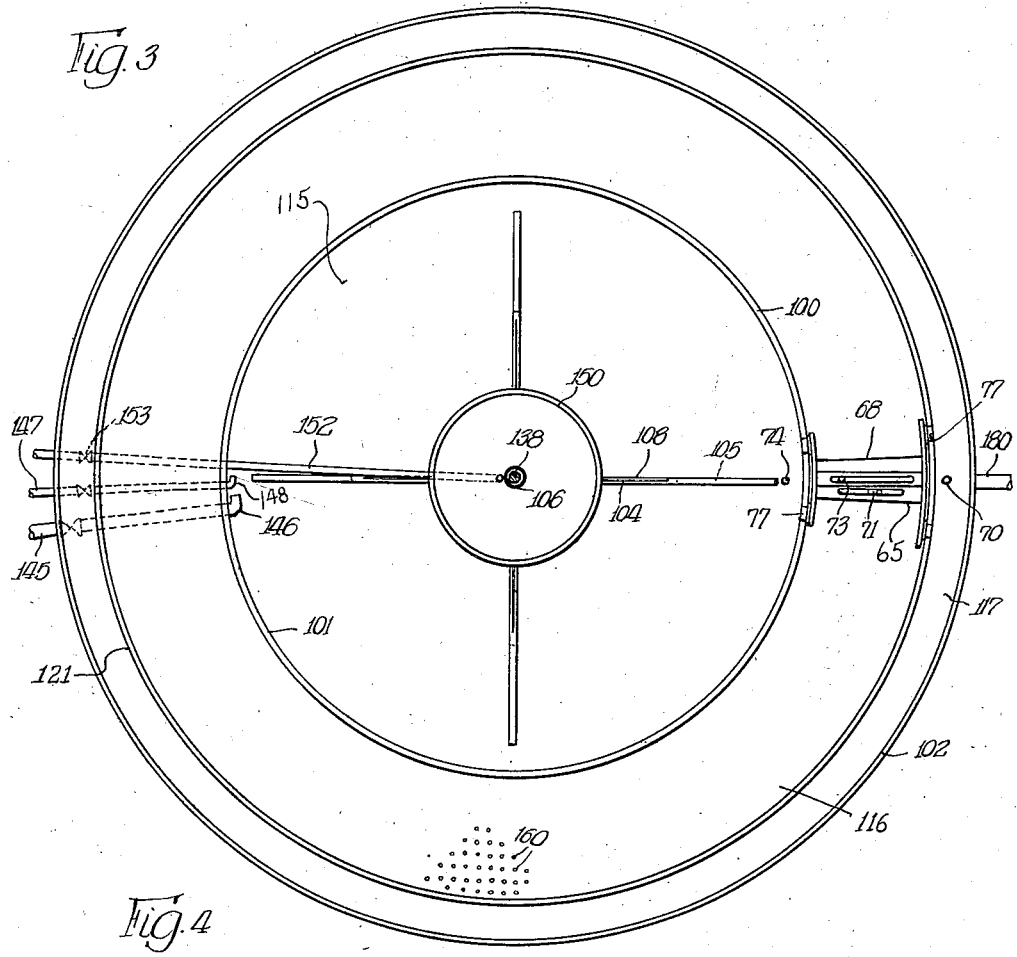
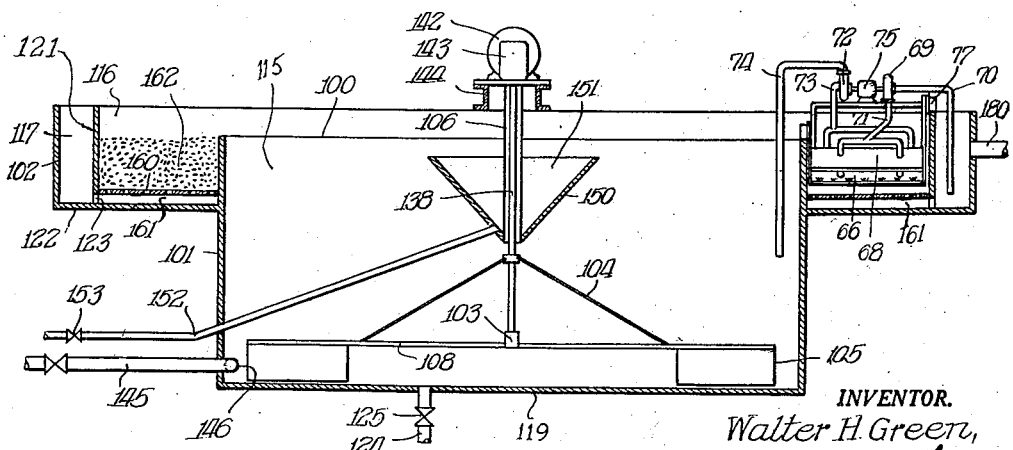

Patented Dec. 25, 1945

2,391,697

UNITED STATES PATENT OFFICE 2,391,697

LIQUID TREATING APPARATUS AND PROCESS

Walter H. Green, Batavia, Ill., assignor to Infilco Incorporated, Chicago, Ill., a corporation of Delaware Application May 26, 1943, Serial No. 488,794

6 Claims. (Cl. 210—12)

This invention relates to the purification of aqueous liquids such as in the softening or clarifying of water, the clarifying of sewage, and the like.

One of the objects of this invention is to provide a compact apparatus for the treatment of liquid to remove impurities in solid form therefrom.

Another object of the invention is to provide an improved method and apparatus for the dosing of a liquid with a treating reagent and the subsequent complete separation of precipitate from the liquid being treated.

A still further object of the invention is an improved method and apparatus for the treatment of liquid by what has come to be known as the slurry process whereby there is accomplished a complete separation of liquid being treated and solid impurities suspended therein.

These and other objects of the invention will be apparent from the specification and claims which follow.

It has long been known to dose a liquid, such as water, with a chemical reagent to form a precipitate therein. In the treatment of water to remove impurities therefrom, such as the softening of a hard water or the clarification of a turbid or colored water, the clarification of sewage, and the like, it is known to first dose the water with a chemical reagent, such as lime or alum, to form a precipitate which is then separated from the water as completely as possible. In the past the most common treatment has been to mix the reagents and water, followed by a preferably gentle agitation in order to aggregate the small precipitates formed by the reaction; and then to pass the mixture into a large sedimentation basin in which the liquid could be held in a quiescent condition for periods of about four hours in most cases but often longer, during which time a major portion of the precipitate sedimented from the liquid and was collected upon the floor of the basin. Such apparatus is quite expensive due to the very large size of basins needed to provide the necessary holding time for the liquid and also due to the fact that even with a holding time of four hours, it was usually impossible to secure sufficiently complete clarification of the treated water. Consequently it has also been common practice to provide large sand filters through which the water would be passed after the sedimentation step in order to remove fine precipitate which was not deposited in the sedimentation basin. Such filters were normally of large area because of the fact that a large amount of precipitate was collected on the filter, thereby rapidly increasing resistance to the flow of water therethrough. The filters therefore had to be large to provide for a suitable low flow over periods of such length as not to require too frequent washing, with consequent waste of time and wash water. Also duplicate units were necessary to provide for a sufficient supply while one or more filters were being reconditioned for service. In normal operation of such plants in the past, filters had to be washed several times a day, which required a great deal of labor and wasted a considerable amount of water used for backwashing or filter cleaning. In my present apparatus and process I provide for a low rate of return wash water flow, and this return into a place and process where rapid absorption and removal of the solids therein with consequent rapid reclarification of the wash water is obtained. One of the objects of my invention is to provide a water treating plant of the general nature described which is much smaller than those heretofore necessary to treat equal amounts of water.

Another object of my invention is to provide an improved system in which the water used for the cleaning of the filters is not wasted but is returned to the process for clarification.

It is known that if a water is properly treated in and by a slurry containing water undergoing treatment and solid particles accumulated from previously treated water and if the slurry is so handled as to be kept in proper condition, the solids may be withdrawn from a point in the slurry at a rate corresponding to the rate of entry with, or formation in, the water, and the water can rapidly and abruptly escape from the surface of the slurry clarified to such a degree as to be immediately suitable for many uses, although where the utmost degree of clarity is required some further treatment such as filtration may be applied. The pool of slurry may be regarded as a temporary retention or enlargement of the flow of water and the chamber or basin holding the pool of slurry as an enlargement of the flow conduit. Such a pool of slurry and the treatment of water in it is of course not itself new but I propose to use it in a new way. Heretofore it has been the practice to so construct and dimension the apparatus as to provide therein a slurry holding chamber of suitable size that served as a mixing and reaction space and beyond this a second chamber or space used as a clarifying compartment or space into which the slurry extends and which is so arranged as to provide a slurry surface of such dimension that clear water will escape therefrom at a desired rate, this compartment being of depth to provide for retention therein of a column of clear water commonly several feet deep, over the slurry surface. The necessity of providing such compartment and surface area has a major effect in determining the size and cost of such apparatus and particularly so in those cases, not uncommon, where the character of the water varies considerably and it is necessary to provide for the worst condition. Contrary to this practice I do not propose to construct or operate my apparatus so as to get such clear water from the slurry surface or to store clear water in the clarifying compartment. I do popose to remove the bulk of or at least a very substantial part of the solids from the slurry in the slurry chamber but to let the water flowing from this chamber carry an amount and sometimes a very considerable amount of suspended solids with it and to remove these later by an advantageous form of filter, as will be later referred to. By this procedure the filter takes the place of the usual clarification compartment and the treating basin may be reduced to about the size of the usual mixing and reaction compartment of slurry type treating apparatus.

While the mixing and reaction chamber in which the slurry pool is maintained and acts, and the filter, and their combined functioning are important elements in my invention, the apparatus will not be complete and operative and treatment of water successfully carried out without the additional feature of suitable means for separating and removing solids directly from the slurry for otherwise an undue or prohibitive load will be placed on the filter. It is the relation and cooperation of these elements that permit successful operation without the usual clarification chamber. Due to the treatment of the water in and by the slurry the character of the solids formed in the slurry is such that they may be rapidly separated or removed therefrom and thickened to form a comparatively thick sludge and this thickening can be done in a chamber or space that is quite small. For the removal of the solids from the slurry I propose to use a separator or concentrator that may take a form and be operated in accordance with the teachings of my copending application No. 381,364. The solids collected in such a separator, or concentrator, are discharged to waste therefrom in thickened form with a comparatively small discharge or waste of water therewith.

To effect the final clarification of the treated water after leaving the slurry pool I propose to use a filter of which only a small portion will be cleaned at any one time, such as that shown in the application of Streander, No. 378,931. This type of filter has the characteristic of using a shallow bed and of having a traveling cleaner by which the whole area and volume of the bed may be quickly cleaned a small section at a time, and this cleaning can be carried out while the filter is in continuous operation. In the common type of filter the filter area is usually divided up into a number of separate filter units and for reasons of cost of construction and care of operation the area of each unit is made as large and the number of units as small as is practical for the particular case, so that when a unit is cut out for washing a considerable proportion of the filter area is out of service, and this for a considerable time as it is necessary to cleanse a large bed. Furthermore the volume and rate of waste water flow is high during this period because the area being washed is considerable and a very high flow per unit of area is required for cleansing. By using the type of filter here proposed only a small area is being washed at one time and the volume and rate of wash flow is low so that the washing does not reduce plant output as the area left in service will readily carry the load and also the small flow of wash water with its contained impurities may be returned to the slurry pool without upsetting conditions there. In the prior art such wash water had to be wasted or large settling space provided for its clarification. In contrast, I return such wash water directly to the slurry chamber.

It will thus be seen that while the several elemets contained in my new apparatus are not in themselves new, yet I have combined them in a new way or relation of construction and of operation, and that I have omitted the clarification space or step wherein clear water escapes from the slurry surface, that has heretofore been characteristic of slurry type apparatus and operation and by so doing have secured great advantages, such as decrease in size of apparatus. As said above I do not plan to normally take clear water from my slurry, although at times, as for instance during periods of low flow, the escaping water may be of low turbidity or even entirely clear. Instead I plan to let the filter take what might under past practice be considered as an undue burden, which with the set-up and operation described, I can do without waste of wash water or other operating difficulties or losses. In operating this way the solids carried on to the filter are naturally the lighter or finer particles, for while the greater proportion of the particles are retained in and removed from the slurry it is such lighter particles that more readily escape. I have found that it is the tendency of these lighter or finer particles to rise and escape with the water that limits the capacity per unit of area of the ordinary upflow slurry type plant so that the capacity of such plants is from about three-fourths to about one and one-fourth gallons escape of clear water per square foot of area when the water rises nearly vertically toward and through the slurry blanket surface. When the escape is from a laterally moving surface or subsurface as taught in my copending application No. 471,635, then the escape may be double or more than double such rates. I have observed, however, that when these lighter solids are carried over onto the filter bed as I now propose, and because of or during their retention there, they amalgamate into much larger and more dense particles and that when these are returned to the slurry pool they not only tend to remain in the heavy slurry and be removed therefrom as before described, but also they have a beneficial effect on the character thereof as to its density and solids retention effect so that less solids go to the filter. Thus there is a co-action between the filter and the slurry whereby the troublesome lighter solids are not only readily disposed of but may in some instances even become beneficial in conditioning the slurry pool, and thus the size of the whole apparatus may be further reduced.

It is inherent in the nature of such slurries that their volume will vary from time to time depending on the conditions existing. Thus the slurry will expand with increasing flow therethrough, as will any suspension; it will expand or contract with change of the nature of particles entering or formed as the character of the entering water may vary, becoming greater with lighter particles and lesser with heavier particles. It will also vary with the amount of solids allowed to remain therein, that is, dependent on the action or operation of the solids removal device. In the usual type of slurry treatment apparatus the rather deep clarifying space allows for such things without disturbing the operation as a whole. Since I am proposing reduction or elimination of this clarification or clear water storage space, the mixing and reaction chamber in which the slurry is contained may if desired be made somewhat larger than heretofore, but undue expansion can usually be taken care of by withdrawing solids to waste more rapidly from the slurry. It will be seen that by thus proposing the reduction or elimination of the usual clarification space theretofore provided in such apparatus, I directly effect a reduction in size and cost, and by so doing I enlarge the flow per unit of area beyond the limitation of the prior art.

Briefly my invention comprises a treating tank or basin, one portion of which is a solids conditioning zone containing therein a mixing and reaction zone, and the other part, adjacent the conditioning zone, is a filter chamber. Preferably the two zones are compartments contained in a single tank, separated one from another by partitions or partial partitions. For the mixing and reaction zone I provide an agitator and driving means therefor of sufficient size and capacity to provide a pronounced and even turbulent overturning agitation and circulation of liquid throughout the zone and that may extend into other parts of the solids conditioning chamber. Liquid to be treated and a treating reagent are introduced, usually separately, into the solids conditioning zone. During the treatment a large quantity of precipitate formed in and accumulated from the previous treatment of water is maintained in suspension in the water in the conditioning zone to form therein what has come to be known as a "slurry" so that entering liquid to be treated and reagents are mixed in and with a considerable amount of such slurry. I also provide a solids separating chamber the position or functioning of which is an important part of my invention as will be referred to in more detail later on. Preferably this chamber will be placed with its upper edge at a level slightly below the upper edge of the partition separating the mixing and reaction chamber from the filtering chamber, so that solids in the slurry can be partially removed therefrom by the skimming effect of such a separator. Partially clarified water will then flow over the dividing partition into the filter, through the filter, and will be discharged therefrom as clarified liquid. The solids which are retained by the filter will amalgamate into larger and denser particles, and will be returned with the wash water to the body of slurry, thus replacing troublesome light solids by large and dense particles. Preferably the filter is provided with a hydraulic filter cleaner such as heretofore mentioned, so that the dirty wash water returns to the body of slurry as a small flow.

The apparatus and process of my invention will be more fully understood by reference to the drawings which form a part hereof and in which like reference characters designate similar elements.

Figure 1 is a vertical, cross-sectional view of a preferred embodiment of my invention.

Figure 2 is a plan view of the apparatus shown in Figure 1, taken along the horizontal planes indicated by the line 2—2 of Figure 1.

Figure 3 is a plan view of another embodiment of my invention.

Figure 4 is a vertical, cross-sectional view of the apparatus shown in Figure 3.

The apparatus of my invention can be contained in any suitable tank 10, which for purposes of illustration is shown as rectangular in Figures 1 and 2. The tank of this embodiment comprises side walls 11 and 13 and end walls 12 and 14. It will be obvious that the tank could be of other shape and size if desired. Preferably the tank 10 is divided into a relatively deep slurry chamber or solids conditioning chamber 15 and a relatively shallow filtering chamber 16 and filtered liquid chamber 17. A partition 18, which extends from below the liquid level in tank 10 down to the floor 19 of the slurry chamber 15, separates that chamber from the filter chamber 16 and is provided with a weir 20, which may be used as a rail for the filter cleaner hereafter described. The filtering chamber 16 and the filtered liquid chamber 17 are separated by a partition 21 which extends from above the liquid level in the tank 10 down to the floor 22 of the shallow portion of the tank 10 and is provided with a plurality of passageways 23 adjacent the floor 22. The three chambers are therefore in hydraulic communication, the slurry chamber 15 and the filtering chamber 16 over the weir 20 and the filtering chamber and the filtered liquid chamber 17 through the lower ports or passageways 23 in partition 21. A treated liquid outlet 80 leads from the filtered liquid chamber 17. The tank 10 ordinarily will be provided with a suitable drain or drains, such as 24, provided with a valve 25, so that the entire apparatus can be drained in case of shutdown.

The slurry chamber 15 is divided by a suitable partition structure 30 which may be a cylinder, or conduit, as shown and preferably placed in the center thereof. The partition structure 30 is supported above the floor 19 of the chamber by any suitable means such as standards 31 and terminates, as at 32, in a plane spaced somewhat above the liquid level therein. This partition structure 30 divides the slurry chamber 15 into an inner mixing and reaction zone 33 and an outer return flow space 34. An outlet communication, which may be in the form of a slot 35, is provided in the upper portion of the cylinder, a short distance below the skimming weir of the solids thickener hereafter described. Spacing bars 36 can be used to maintain the upper and lower portions of the partition 30 in proper spaced relationship. It is preferred that the lower portion of the outer return flow space 34 be provided with sloping walls 37 to prevent the accumulation of solids in quiescent corners.

A shaft 38 is mounted in the mixing and reaction zone 33 and extends upwardly through the cylinder 30, being journaled in suitable bearings, such as 39, supported by any suitable means, such as spider 40. A liquid moving member, such as stream projecting impeller 41 is mounted on the shaft 38 in such a manner as to turbulently direct a stream of water through the mixing and reaction zone 33. The shaft 38 is rotated by a motor 42 and speed reducer 43, which are carried above the tank by any suitable means, such as beams 44. Obviously many other means for causing mixing and circulation can be used for that purpose, in addition to the propellor shown for illustration. Liquid to be treated is introduced into the mixing and reaction zone through an inlet conduit 45, preferably discharging tangentially, as at 46. A treating reagent is also introduced into the mixing and reaction zone 33 through a suitable chemical feed pipe 47, likewise discharging tangentially within the chamber, as at 48. The slurry chamber 15, as shown in the drawings, is arranged in such a manner that the flow therein caused by the impeller 41 is upwardly through the mixing and reaction zone 33, outwardly through the outlet communication 35, and downwardly in the outer flow return space 34. Turbulence in the uppermost portion of the tank is confined to the space within the cylinder 30. In such a construction it is preferred that the water and reagent be introduced into the inlet end of the mixing and reaction zone, which in this instance is at the lower end thereof. As is customary in slurry treatment, it is preferred that the water and reagent be introduced separately so that the one may be thoroughly mixed in and with the slurry prior to contact with the other.

A solids separating, or thickening, chamber 50 is placed in the slurry chamber 15, preferably on the partition 19 separating the slurry chamber 15 from the filtering chamber 16, as shown. The open upper end 51 of the solids thickening chamber 50 forms a submerged skimming weir, which is preferably placed a short distance below the overflow weir 20 separating the slurry chamber 15 and the filtering chamber 16, and above the level of the outlet communication 35 from the mixing and reaction zone 33. In most constructions it will be advantageous to place the submerged skimming weir 51 about one to two feet below the overflow 20. A thickened solids outlet 52, provided with a flow control valve 53, leads from the lower portion of the solids thickening chamber 50 for the ready removal of thickened solids therefrom.

In the filter chamber 16 a perforated plate 60 is supported by any suitable means a short distance above the floor 22 thereof so as to provide a filtered liquid collecting channel 61 therebelow and to support a filter bed 62 thereabove. I prefer to provide a filter bed cleaner generally designated by the reference character 65, preferably of a type such as shown by the copending application of Streander No. 378,931. Briefly, such a cleaner may comprise a cleaner head 66, provided with a series of discharge nozzles 67 at its lower edge.

Above and around the cleaner head 66 is a caisson 68 which encloses dirty water and filter bed material being washed. A pump 69, the suction side of which is connected with the filtered liquid chamber 17 by means of a pipe 70, supplies liquid under pressure to a pipe 71 and thence to the cleaner head 66. Another pump 72, the suction side of which is connected by means of a pipe 73 to the caisson 68, discharges into pipe 74, which conducts the dirty wash liquid back into the slurry chamber 15 as shown. The two pumps can be driven by a single motor 75, as shown, or by separate motors if desired. The cleaner mechanism is supported on a suitable framework 76 carried by wheels 77, one pair of which may travel upon the weir 20 of the partition 19 separating the slurry chamber 15 from the filtering chamber 16, and the other pair of which may ride upon a suitable rail 78 affixed to the partition 21, which separates the filtering chamber 16 from the filtered liquid collecting chamber 17. The filter cleaner 65 may be caused to travel along the filter bed by any suitable means, not shown.

A treated liquid outlet 80 leads from the filtered liquid chamber 17, preferably at a distance somewhat above the floor thereof so as to provide a body of filtered water of sufficient depth to enable clear water to be pumped to the filter cleaner 65.

Water to be treated is introduced through the inlet conduit 45 and a treating reagent is added through the chemical feed line 47. The impeller 41 is rotated by means of the shaft 39, driven by the motor-reducer 42—43, and establishes a turbulent and upward flow of liquid in the mixing and reaction zone 33. The liquid issuing from the outlet communication 35 of the mixing and reaction zone 33 flows laterally into, and down in, the return flow space 34. In my process it is desirable to drive the impeller at a speed sufficient to circulate a large volume of liquid, considerably in excess of the raw liquid entering to be treated, whereby a large amount of liquid is drawn into the open lower end of the mixing and reaction chamber. This causes a rather rapid and agitated overturning of the contents of the basin 15 through the mixing and reaction zone 33 and downward through the outer return flow zone 34. The upper part of the cylinder 30 suppresses agitation in a shallow outflow zone adjacent the top of the tank. It is desirable to provide a condition of at least semi-quiescence in the upper outer portion of the slurry chamber 15, which space has been called the "outflow zone." However, the liquid in such zone need not be as quiet as in the clarified water zone of the usual slurry treatment nor need such zone be as deep as usual, as it is not essential, in my apparatus and process, to remove all of the solids from the water before passing it from the solids conditioning chamber into the filter. The solids thickener, or skimmer 50, due to its well known skimming action, will remove, or skim, the heavier, and the major portion, of solids from the treated liquid rising in the slurry chamber 15, so that compared to the slurry itself the treated liquid is relatively clear. However, as before stated, the treated liquid is not clarified to the extent heretofore sought in such apparatus nor commonly to such extent as to be ready for use. This partially clarified water passes over the weir 20 into the filter chamber 16.

During operation a substantial quantity of solids accumulated and collected from previously treated water while in a state of suspension is maintained in suspension, by means of the agitation and circulation through the mixing and reaction zone 33 and the return flow zone 34 to provide a slurry in the solids conditioning chamber 15, extending at least to the elevation of the skimming weir, or mouth 51 of the solids concentrator 50. A large quantity of slurry is recirculated through the mixing and reaction zone 33, whereby liquid to be treated and the treating reagent are reacted in and with the slurry to form relatively dense and tough particles, most of which are readily separated by the skimming action of the solids thickener 50. The partially treated water after separation of the greater portion of the solids by the skimmer 50 passes over the dividing weir 20 into the upper part of the filter chamber 16, thence passes through the filter bed 62 through the perforated plate 60 into the collecting channel 61 and through the ports 23 into the filtered liquid chamber 17. From time to time, or continuously, as desired, the hydraulic cleaning means, or filter cleaner 65 will be moved along the filter bed, whereby the bed is thoroughly washed and cleaned and the cleaning water discharged through the cleaner outlet pipe 73 and pipe 74 into the slurry in the slurry chamber. As heretofore indicated I have found that the lighter and fine solids carried over into the filter chamber are aggregated on the filter and when returned to the slurry are readily removed by the skimmer 50.

It has been necessary heretofore to provide large and deep clarification and clear water holding space in liquid treating apparatus of the slurry type. In contrast, I provide only a relatively small and shallow non-turbulent overflow zone, as I endeavor to abstract only the greater part of the particles from the slurry rising in the slurry chamber. This abstraction of solids is accomplished by the solids skimmer and thickener 50. It is to be understood that I make no effort to completely clarify the throughput of water in the treating chamber but only skim the larger and heavier particles, which ordinarily constitute the major portion of the solids in the treatment, by the solids thickening chamber and permit light solids to pass with the liquid onto the filter. The return of the small amount of water used by the cleaner directly into the slurry treatment does not upset operating conditions in the solids conditioning chamber. By using the concentrator as described, I am able to get the effect of sedimentation in the way of removing most of the solids in the flowing water without providing the space required for such a basin, thereby decreasing the cost of the plant and still do not overwork the filter. The return of agglomerated solids from the filter into the slurry, as explained above, promotes the aggregation of other solids and their ready separation from the liquid.

Figures 3 and 4 illustrate another embodiment of my invention, which is particularly suitable for certain kinds of water such as those in which a particularly dense precipitate is formed by the reaction. In this embodiment, the tank can be of any size or shape, but for purposes of illustration is shown as a shallow, circular, flat bottomed tank 100, enclosed in a vertical side wall 101 and a flat bottom 119. Surrounding the upper portion of the vertical wall 101 is an annular chamber 116 formed by vertical wall 102, and a substantially flat bottom 122. A partition 121 separates this annular chamber into a filter chamber 116 and a filtered liquid chamber 117. The filter chamber 116 is substantially like that described in connection with Figures 1 and 2, and includes a perforated plate 160, supporting a bed of filter bed material 162 and providing a collecting channel 161 therebelow. Preferably the collecting channel communicates by any suitable means, such as ports 123, in the partition 121, with the filtered liquid chamber 117, which in turn communicates with an outlet pipe 180. The filter may have a filter cleaner of the type referred to in connection with Figures 1 and 2, except that it may be preferable in connection with an annular filter to provide for one way travel only. In this embodiment the entire tank 100 comprises the solids conditioning, or slurry, chamber 115, which is not divided into separate zones.

An agitator 103 is provided in the slurry chamber 115 and comprises a vertical shaft 138 suspended from a motor-reducer 142—143 by means of a suitable thrust bearing, not shown, which motor-reducer can be supported above the tank by any suitable means such as beams 144. Agitator arms 108 are mounted on the vertical shaft 138 adjacent the floor 119 of the tank and supported by any suitable means such as tie-rods 104. A plurality of paddles 105 are preferably pivotally suspended from the agitator arms so that on rotation of the shaft 138 by the motor and reducer, a pronounced, and even turbulent, rotational agitation is provided in the lower part of the solids conditioning chamber 115. The upper portion of the vertical shaft 138 may be enclosed in a suitable means such as cylinder 106.

Water to be treated may be introduced into the lower portion of the solids conditioning chamber 115 by any suitable means such as a conduit 145, which preferably may discharge tangentially as shown at 146. A treating reagent may be introduced to the entering raw water in any suitable manner, such as through chemical feed line 147, discharging as at 148. In many instances better results are secured if the water and chemical are separately introduced into the mixing and reaction chamber, although in some installations and with many types of water the chemical feed line 147 may discharge into the water inlet conduit 145. The tank is also provided with a drain 124, which is equipped with a suitable valve 125.

The slurry chamber 115 is provided with a suitable solids concentrator or solids skimmer 150, which may be supported in any suitable location within the chamber such as on the wall, as shown in Figure 2, or suspended in a central portion of the chamber, as from the cylinder 106, as shown in Figure 4. In most installations, such a concentrator may comprise a funnel shaped chamber, the open top 151 of which provides communication with the solids conditioning chamber 115. In some types of treatment, however, the solids formed by the treatment may be quite voluminous, in which case it may be desirable to provide a larger solids concentrator placed on the inside of the vertical wall 101 separating the slurry chamber 115 and the filter chamber 116. The solids concentrator preferably is located at a level in the slurry chamber slightly below the upper edge or weir portion of the vertical wall 101 which divides the slurry chamber 115 from the filter chamber 116. This location is desired as it is known that such concentrators have a skimming action and I have found that better results are secured if such a concentrator is so placed as to skim solids from the slurry rising in the slurry chamber 115 and permit some free rise of water above that level before it passes into the filter chamber. The solids concentrator 150 is provided with a sludge outlet 152 equipped with a valve 153, so that solids may be discharged to waste as desired.

In operation, the water to be treated is introduced through the inlet conduit 145 and treating reagent is added through the chemical feed line 147. The agitator 103 is rotated by means of the motor-reducer 142—143 and establishes a rotational agitation of liquid in the lower portion of the tank. Obviously, there will be considerable rotational movement of water in the upper portion of the tank and in ordinary water treating apparatus this would be undesirable. However, in the apparatus of my invention it is not necessary to remove all of the solids from the water before passing it from the treatment chamber into the filter, but only the greater portion thereof. The solids concentrator 150, due to its well known skimming action, will remove the larger portion of solids from the liquid rising in the slurry chamber 115. During operation a substantial quantity of solids accumulated and collected from previously treated water while in a state of suspension is maintained in suspension, by means of the liquid circulating member, or agitator 103, to provide a slurry in the solids conditioning chamber extending at least to the elevation of the inlet 151 of the solids concentrator 150, whereby the liquid to be treated and the chemical reagent are introduced into and mixed with rotating slurry. The partially treated water after separation of most of the solids by the concentrator 150 passes over the dividing wall 101 into the upper part of the filter chamber, thence passes through the sand filter bed 162 through the perforated plate 160 into the collecting channel 161, the filtered liquid chamber 117, and thence to a point of use. From time to time, or continuously, as desired, the filter cleaner will be moved along the filter bed 162, whereby the bed is thoroughly washed and cleansed and the cleaning water discharged through the outlet pipe 74 into the slurry in the slurry chamber 115.

It will be understood that the term "slurry" refers to a suspension of solids precipitated and accumulated from previously treated water and water undergoing treatment, the amount of solids in suspension being considerably more than those that are formed by its treatment with chemical reagents in an equal amount of raw water. "Partially clarified slurry" is slurry from which the larger and heavier particles have been removed and in reality is not a slurry but only a suspension of a small amount of fine solids in fairly clear water. However, the term has been used herein to indicate the suspension which started as a slurry and from which the heavier solids (a very large proportion of those in the slurry) have been abstracted by the skimming effect of the solids concentrator as the slurry rises in the slurry chamber.

Many modifications of the structures herein described will be obvious to those skilled in the art, and all such obvious modifications are intended to be included within the scope hereof.

I claim:

1. Water treating apparatus comprising a slurry chamber having a bottom and an upstanding boundary wall, a mechanical agitator in said chamber, means for rotating said agitator, a supply inlet opening into the lower portion of said chamber, a filter chamber, a hydraulic communication between said slurry chamber and said filter chamber adjacent the upper edge of said boundary wall, a filter bed in said filter chamber, an outlet for filtered water from said filter chamber, means for washing said filter, means for delivering dirty wash liquid from said filter into said slurry chamber, a solids depositing chamber within said slurry chamber, an inlet into said depositing chamber in proximity to but spaced below the upper edge of said boundary wall, whereby more readily separable solids are skimmed from slurry rising to said hydraulic communication, an outlet from said depositing chamber to waste, and a drain outlet from the lower portion of the slurry chamber.

2. Water treating apparatus comprising a slurry chamber, a water inlet into said chamber, a reagent inlet for delivering treating reagent to the water, an overflow from the upper portion of said chamber, means for partially clarifying liquid rising in said chamber to said overflow comprising a solids depositing and thickening chamber within said slurry chamber and having a skimming weir spaced below said overflow a distance of not more than about two feet, and a solids outlet from the lower portion of said solids thickening chamber, means for maintaining an overturning agitation in said tank below the level of said skimming weir and for suppressing such agitation thereabout comprising a stream projecting impeller, a prime mover operatively joined to said impeller, a partition structure surrounding said impeller and extending upwardly therefrom, and a communication between the space enclosed by said partition and the space within said slurry chamber outside of said partition at a level adjacent but below the level of said skimming weir, a filter chamber in hydraulic communication with said slurry chamber through the overflow, a filter bed in said filter chamber, an outlet for filtered water from the lower portion of said filter chamber, a hydraulic cleaner adapted to be moved along said filter bed, means for supplying cleaning liquid to said hydraulic cleaner and means for removing dirty cleaning liquid from said filter chamber and delivering the same into said slurry chamber.

3. In a liquid treating apparatus of the type wherein liquid is treated with reagent in the presence of a circulating slurry, a slurry chamber, inlet means for liquid to be treated and reagent opening into said chamber; an agitator adapted, on rotation thereof, to mix water to be treated and reagent in and with a slurry in said chamber and to cause and maintain a turbulent circulation of slurry substantially throughout said slurry chamber; means to rotate said agitator; and an outlet from said slurry chamber establishing the normal liquid level therein, the combination with such apparatus of means for partially clarifying treated liquid comprising a partition structure surrounding said agitator and extending to a point above the normal liquid level in said slurry chamber, said partition structure having an inlet from the lower portion of said slurry chamber and an outlet discharging into said slurry chamber at an elevation below said first mentioned outlet, a solids skimmer having an open top intermediate said first and said second outlet, and a solids outlet from said skimmer, and means for completing clarification of partially clarified liquid comprising a filter chamber in hydraulic communication with said slurry chamber and receiving partially clarified liquid through said first outlet, a filter bed in said filter chamber, means for washing said bed, a wash water outlet conduit leading from said washing means into said slurry chamber, and means for withdrawing filtered water from said filter chamber.

4. In a slurry type water treating apparatus a tank, a partition wall dividing said tank into a slurry chamber and a filter chamber, the top of said partition wall being below the normal liquid level in said tank, means for delivering water and reagent into said slurry chamber, a liquid moving member for mixing water and reagent in and with a slurry in said slurry chamber and for establishing a circulation of slurry embracing substantially the entire volume of said slurry chamber, a solids depositing chamber within said slurry chamber having an inlet at a level spaced below the top of said partition wall a distance of the order of about one or two feet, a waste outlet from said solids depositing chamber, a filter bed in said filter chamber, hydraulic washing means associated with said bed, a wash water outlet conduit leading from said washing means and discharging into said slurry chamber, and means for withdrawing filtered water from said filter chamber.

5. A cyclic process of conditioning the slurry in a slurry type water treatment, comprising the steps of maintaining a body of slurry containing water undergoing treatment and particles retained from previously treated water, introducing water to be treated and reagent into said slurry, agitating and circulating the slurry in an agitation zone to form large and heavy solid particles by aggregation and agglomeration, separately removing the more and less readily separable solids from an output portion of said slurry by first skimming off more readily settleable solids and withdrawing them to waste, and then filtering out less readily separable solids in a filtering zone, aggregating said filtered out solids in said filtering zone into large solids and returning such aggregated large solids to the slurry in said slurry zone.

6. A slurry type water treating process comprising the steps of mixing and agitating water to be treated and treating reagent in and with a large body of circulating slurry in a slurry zone, displacing unclarified water upwardly from said body of circulating slurry, skimming readily separable solids from said displaced water at one level within said zone and withdrawing them to waste, flowing the displaced water with contained less readily separable solids from another and higher level in said zone into a filtering zone, retaining and aggregating solids in said filtering zone, withdrawing clear water from said filtering zone, and washing aggregated solids from said filtering zone back into said slurry zone.

WALTER H. GREEN.